Patented Mar. 10, 1942

2,275,784

UNITED STATES PATENT OFFICE 2,275,784

PRODUCTION OF CORRECTIVE NUTRIMENT

Siegfried Maurer and Harold Oliver Wiles, Chicago, Ill., assignors to Armour and Company, a corporation of Illinois No Drawing. Application October 27, 1938, Serial No. 237,318

2 Claims. (Cl. 167—74)

The present invention relates to the production of a nutriment concentrate from mammalian liver, and has particular reference to the separation from mammalian liver material of a fraction which beneficially is included in the diet of females subject to undue functional uterine bleeding.

The biological factors involved in menstruation cause a periodic discharge of blood by reason of the passing off of uterine membrane after periods of non-fertilization. In many cases the amount of the functional uterine bleeding is detrimentally excessive, requiring inactivity during the excessive flow and causing a drain upon the general physical condition.

A principal object of the present invention is the provision of a material which may be consumed orally to retard undue functional uterine bleeding without retarding normal menstrual flow.

Additional object of the invention is the production of a nutriment concentrate from mammalian liver which includes the non-alkali-labile fat-soluble portion of the lipoid fraction of the liver.

A further object of the invention is the separation from an extract of mammalian liver of an unsaponifiable fraction which is unaffected by hot alkali, fat-soluble and normally water-insoluble and which may be substantially free from the anti-anemic and alkali-labile portions of the liver tissue with which it originally was combined.

A still further object of the invention is to provide a nutriment concentrate from mammalian liver by producing a solution of materials from mammalian liver which are soluble in fat solvents, subjecting the materials to hot saponification, and separating from the reaction products thereof the materials which are unaffected by the alkali treatment.

These and other objects of the invention will be observed from a consideration of the following description of a preferred embodiment of the invention.

For many years liver extract has been recognized as constituting a beneficial nutriment in cases of anemia involving restoration of blood conditions to a normal status. Undue uterine hemorrhage occurs in the case of many women independently of anemic conditions. That is, women with normal blood conditions in so far as anemia is concerned as well as women having a deficient build-up of blood cells may be subject to menorrhagia and metrorrhagia. We have discovered that there may be isolated from mammalian liver a nutriment having a corrective effect (i. e. an anti-menorrhagic fraction), when taken orally, upon undue functional uterine hemorrhage.

In preparation of the nutriment fresh beef livers are prepared for extraction. This preparation may include a freezing operation for the purpose of rupturing the cell walls. Thereafter the liver material is finely minced or ground and then subjected to an extraction by a solvent which may be 60 to 80 per cent ethyl alcohol. Extraction by such a solution results in the principal part of the fatty constituents of the liver being brought into solution. Apparently the presence of phosphatids extracted from the liver by the solution assists in bringing the fats or fat-soluble portions of the liver into solution.

The extraction operation preferably is carried out at a low temperature, and the alcoholic extract is evaporated in vacuo to remove most of the alcohol. The resulting aqueous residue is extracted with a water-immiscible fat solvent such as benzol, ethyl ether or petroleum ether. The resulting fatty solution is subjected to evaporation under reduced pressure to produce a mixture containing lipoids, neutral fat and unsaponifiable fat-soluble substances.

The particular amount of residue obtained in this manner will depend upon such factors as the condition of the livers from which the extract initially is obtained and upon the effectiveness of the operation of the process. In one example there was obtained a quantity of fat-soluble residue which constituted about 4 per cent on a dry substance basis of the original liver material.

The residue obtained from evaporation of the fat solvents principally consists of saponifiable liver fats. For purposes of identification this residue may be referred to as the lipoid fraction of the liver. The next phase in the process for producing the nutriment consists in subjecting the lipoid fraction to hot saponification. This saponification preferably is effected by mixing the lipoid fraction with an alcoholic solution of an alkali, the mixture being heated to boiling temperature for approximately 1 hour. The amount of alkali in the mixture is sufficient to saponify the glycerides or other fatty acid mixtures present in the mixture.

After completion of the saponification reaction there is effected a separation of the unsaponified or non-alkali-labile constituents of the mixture. To effect this separation the mixture may be subjected to extraction with a fat solvent, such as benzol, ethyl ether or petroleum ether, preferably after the addition of an equal volume of water to the mixture. The solvent is separated from the aqueous mixture and evaporated under reduced pressure to yield a residue which has not been deleteriously affected by the hot alkali.

This unsaponifiable residue contains substantial quantities of cholesterol and may further be concentrated, if desired, by crystallization therefrom of any desired quantity of the cholesterol, the crystallization being effected from methyl alcohol or petroleum ether or other suitable solvent.

As in the case of the lipoid fraction, the yield of the unsaponifiable fraction will depend upon the nature of the material being treated and the effectiveness of the separation operation. In one example of the process the unsaponified fraction constituted approximately 0.24 per cent of the original liver tissue, calculated on the dry substance basis. This yield was obtained from a lipoid fraction constituting about 4 per cent of the original liver tissue. In this example about 50 per cent of the unsaponified residue was crystallized out and separated as cholesterol. There remained as the desired nutriment approximately 0.12 per cent of the original liver tissue.

Although desirable in many cases the crystallization of cholesterol from the unsaponifiable fat-soluble fraction is not necessary in the production of the nutriment.

The unsaponifiable fat-soluble material, with or without removal of cholesterol therefrom, may be dissolved in neutral fats. Other carriers suitable for oral consumption may be used if desired. For instance, the concentrated nutriment may be added to an anti-anemic liver fraction in quantities sufficient to give the desired effect. The desired unsaponifiable lipoid fraction may be suspended in concentrated form in an aqueous medium by substances such as the phosphatids which also are contained in mammalian liver.

The quantity of the nutriment needed to produce the desired correction of undue uterine functional hemorrhage will depend upon the individual characteristics of the person consuming the nutriment and upon the degree to which the nutriment has been concentrated. When prepared as described in the above example the material will be found beneficial to many persons when taken in quantities of about 0.2 gram to 2 grams per day.

Another method of producing the lipoid fraction consists in grinding and macerating the fresh mammalian livers with about 3 volumes of water. The resulting solution is heated to remove coagulable proteins, the coagulum and residual tissue carrying with them a major portion of the lipoid substance of the liver. This mixture, which contains the lipoid fraction, including triglycerides, phosphatids and unsaponifiable substances, is dried and extracted with a suitable fat solvent. The resulting solution is treated as before to produce the lipoid fraction by evaporation under reduced pressure.

Due to the characteristic water-miscible nature of the phosphatids a certain amount of the desired nutritional factor is present in the aqueous extract. After concentration of the aqueous liver extract to syrupy consistency the lipoid fraction thereof, which will carry with it the desired nutriment, may be recovered by extraction with a suitable fat solvent such as petroleum ether.

A further method of producing the lipoid fraction consists in drying the lever tissue and thereafter subjecting it to extraction with a fat solvent.

After preparation of the lipoid fraction by any of the methods described, there follows a further separating operation in which the saponifiable constituents of the lipoid fraction are removed.

The nutriment separated as described herein does not interfere with the normal menstrual flow. However, undue functional uterine hemorrhage effectively is retarded by the nutriment, and after consuming the nutriment for a time which may extend from about a week before the expected menstrual period through the menstrual period, consumption of the material may be dispensed with until shortly before the next expected period. Generally two or three of these periods of consumption of the nutriment are sufficient to provide an accumulative effect. Additionally, the flow during the period in which the nutriment is consumed is prevented from becoming excessive.

As an example of the preparation of the nutriment, 115 pounds of heat coagulum from calf liver tissue extract was extracted with petroleum ether. The ether extract was evaporated under reduced pressure to produce 1500 grams of the fat or lipoid fraction. To this residue was added 4,000 cc. of 95 per cent ethyl alcohol and 700 grams of potassium hydroxide. The solution was heated for 1 hour at boiling temperature to complete the saponification. After the saponification reaction was complete 4,000 cc. of water were added and the solution was cooled and extracted 4 times with a water immiscible fat solvent. The extracts were combined and evaporated under reduced pressure to produce 103 grams of orange colored unsaponifiable residue. This residue constitutes the nutriment and for oral consumption it preferably is dissolved in neutral partially hydrogenated fat, the mixture containing about 0.34 gram of the unsaponifiable nutriment in each gram of the mixture. Approximately 0.2 gram portions of the fat solution of the nutriment are suitable for oral consumption. In this example there was not a crystallization or removal of cholesterol.

In another example of the preparation of the material 200 pounds of heat coagulant from mammalian liver extract was extracted after drying with petroleum ether. The extract was evaporated under reduced pressure to yield 3500 grams of fat or lipoid fraction. This fraction was taken up with 3500 cc. ethyl alcohol (95 per cent), 500 cc. of water and 800 grams of commercial potassium hydroxide. The mixture was heated at the boiling point for about 1 hour and thereafter 3500 cc. of water were added. The solution was cooled and extracted 5 times with an immiscible fat solvent. The combined extracts upon evaporation under reduced pressure yielded 178 grams of unsaponifiable residue. Of this residue 62.5 grams of cholesterol were removed by crystallization from petroleum ether. There remained upon evaporation of the petroleum ether a residue of 111 grams of orange-red waxy solid constituting the desired nutriment. This residue was combined with neutral fats as described to provide about 0.15 gram of residue per gram of the fat mixture.

Any mammalian liver material may be employed for producing the desired nutriment. Cattle, hog, sheep and horse livers constitute the most available sources of the material and for this reason are preferable. The process by which the original liver material is converted into the desired nutriment may be varied from the procedure described herein for purposes of explanation, and the product itself may be correspondingly different. After production, the improved nutriment may, if desired, be employed in other products.

The lipoid fraction of the liver contains saponifiable substances such as triglycerides and substances which are alkali-labile even though the alkali treatment is carried out in the cold. Such substances are to be distinguished from the substantially non-alkali-labile fraction constituting the present invention which will withstand hot saponification.

Removal of the saponifiable constituents effects a further concentration of the material and makes the product greatly more palatable. Solvent extraction of the unsaponifiable fraction of the lipoid portion of the liver may be utilized, and advantage may be taken of the property of substances such as phosphatids in producing aqueous suspensions of the unsaponifiable lipoid fraction in the recovery and concentration procedure. Such changes are intended to be included in the appended claims.

We claim:

1. The method of producing a mammalian liver derivative containing an anti-menorrhagic fraction, which comprises subjecting mammalian livers to extraction to produce a solution of saponifiable and unsaponifiable fat-soluble substances, subjecting the solution to hot saponification with an alkali, separating the unsaponifiable residue, and subjecting the unsaponifiable residue to a crystallization step to remove cholesterol.

2. The method of producing a mammalian liver derivative containing an anti-menorrhagic fraction, which comprises subjecting mammalian livers to extraction to produce a solution of saponifiable and unsaponifiable fat-soluble substances, subjecting the solution to hot saponification with an alkali, and separating the unsaponifiable residue.

SIEGFRIED MAURER.
HAROLD OLIVER WILES.